United States Patent [19]

Heinrich et al.

[11] Patent Number: 5,807,968

[45] Date of Patent: Sep. 15, 1998

[54] POLYAMIDE COMPOSITIONS AND RELATED METHODS

[75] Inventors: Dwight D. Heinrich, Bolingbrook; Reimar Heucher, Westmont; Sandra Drahos, Bolingbrook, all of Ill.

[73] Assignee: Henkel Corporation, Plymouth Meeting, Pa.

[21] Appl. No.: 627,632

[22] Filed: Apr. 4, 1996

[51] Int. Cl.$^6$ .......................... C08G 69/26; C08G 73/10; C08L 77/06

[52] U.S. Cl. .......................... 528/310; 528/332; 528/335; 528/336; 528/338; 528/339.3; 528/340; 524/514; 524/600; 524/606; 525/183; 525/184; 526/348.5; 523/339.3; 523/102

[58] Field of Search .................. 528/339.3, 335, 528/336, 338, 340, 310, 332; 524/514, 600, 606; 525/183, 184; 523/339.3, 102; 526/348.5

[56] References Cited

U.S. PATENT DOCUMENTS

| | | | |
|---|---|---|---|
| 2,793,219 | 5/1957 | Barrett et al. | 562/509 |
| 2,955,121 | 10/1960 | Myers et al. | 562/509 |
| 3,484,403 | 12/1969 | Brunson et al. | 525/183 |
| 4,062,820 | 12/1977 | Mitchell et al. | 528/338 |
| 4,181,775 | 1/1980 | Corke | 428/348 |
| 4,182,845 | 1/1980 | Yeakey et al. | 528/340 |
| 4,218,351 | 8/1980 | Rasmussen | 528/335 |
| 4,760,125 | 7/1988 | Wiemers et al. | 523/339.3 |
| 4,791,164 | 12/1988 | Wichelhaus et al. | 524/514 |
| 4,985,534 | 1/1991 | Heinz et al. | 528/272 |
| 5,080,746 | 1/1992 | Sorg | 156/807.3 |
| 5,272,236 | 12/1993 | Lai et al. | 5236/348.5 |
| 5,278,272 | 1/1994 | Lai et al. | 526/348.5 |
| 5,324,812 | 6/1994 | Speranza et al. | 528/338 |

OTHER PUBLICATIONS

"Synthetic Elastomers", Encyclopedia of Polymer Science & Engineering, index vol., pp. 106–127 (John Wiley & Sons, Inc., NY, NY 1990).

*Primary Examiner*—P. Hampton-Hightower
*Attorney, Agent, or Firm*—Ernest G. Szoke; Wayne C. Jaeschke; Henry E. Millson, Jr.

[57] ABSTRACT

A polyamide resin comprising the reaction product obtained by the reaction of an acid component comprised of a major concentration of a dimer acid and minor concentration of a monobasic acid and an amine component comprised of a major concentration of a short-chain alkylenediamine, a first minor concentration of a medium-chain alkylenediamine and second minor concentration of a polyoxyalkylene diamine having a molecular weight greater than about 500 is provided. The polyamide resin is used to form a blend of containing the polyamide in a major amount by weight and a first minor amount by weight of a polar wax and a second minor amount by weight of a polyolefin elastomer. The composition is used to reinforce a footwear upper, e.g. as a print on box toe material.

45 Claims, No Drawings

POLYAMIDE COMPOSITIONS AND RELATED METHODS

FIELD OF THE INVENTION

The present invention relates to polyamides derived from mixed acids (a polymeric fatty acid and a mono-dibasic acid) and mixed amines (a polyoxyalkylene diamine, a short-chain diamine, and a medium-chain diamine). These thermoplastic resin compositions are excellent reinforcing adhesives for flexible substrates and are particularly useful as box-toe construction resins.

BACKGROUND OF THE INVENTION

It is customary for shoe manufacturers to reinforce the toe end of the upper to obtain improved wear and retention of shape. It is accepted practice throughout the shoe industry to obtain such reinforcement by the application of a thermoplastic stiffening resin, sometimes referred to as a box-toe resin, to the toe portion of the upper. The thermoplastic resin is applied as a melt and upon cooling forms a stiffly resilient reinforcing coating on the upper.

For a thermoplastic resin to be an acceptable stiffener in this application, the resin must satisfy the following requirements: first of all, the resin should have some adhesive character; it should have a low melt viscosity, preferably less than 150 poise at 190° C.; the resin should set rapidly to prevent "welding" of stacked assemblages of the manufactured articles; and the resin must be stiff to impart and retain the desired shape, but it must also have sufficient flexibility, even at low temperatures, to resist cracking upon impact and to "snap back" to its original shape. This latter property, or more correctly, balance of properties is sometimes referred to as "rigid flexibility" and is perhaps the most troublesome and difficult property to develop in a thermoplastic resin, particularly in polyamide resins.

SUMMARY OF THE INVENTION

This invention relates to polyamide resins obtainable by the reaction of an acid component comprised of a major concentration of a dimer acid and a minor concentration of a monobasic acid and an amine component comprised of a major concentration of a short-chain alkylenediamine, a first minor concentration of a medium-chain alkylenediamine and second minor concentration of a polyoxyalkylene diamine having a molecular weight greater than about 500. By "major concentration" is meant that the acid or amine component is comprised of at least 50 equivalent % of equivalents contributed by that acid or amine. By "minor concentration" is meant that the acid or amine component is comprised of less than 50 equivalent % of equivalents contributed by that acid or amine. A polymeric fatty acid obtained by the polymerization of an olefinically unsaturated monocarboxylic acid containing 16 to 20 carbon atoms is an essential component of the acid mixture. Dimer acids having 36 carbon atoms are especially useful in this invention. The acid component is preferably essentially free of short-chain saturated aliphatic dicarboxylic acids containing 7 to 12 carbon atoms, such as azelaic acid and sebacic acid. The equivalent ratio of dimer acid to monocarboxylic acid preferably ranges from 0.95:0.05 to 0.7:0.3. The mixed diamines are comprised of a short-chain diamine, preferably, ethylenediamine, a medium-chain diamine, preferably hexamethylenediamine, and a polyoxyalkylene diamine having a molecular weight preferably from about 600 to 5000. The equivalent ratio of short-chain to medium-chain diamine will typically range from about 2:1 to about 6:1 and the equivalent ratio of the sum of equivalents of short-chain and medium-chain diamine to equivalents of polyoxyalkylene diamine will typically range from about 0.9:0.1 and 0.995:0.005. The resulting reinforcing copolyamide resins typically have an acid value and amine value less than 15, softening point of less than about 125° C. (preferably in the range 90°–110° C.), and viscosity (140° C.) less than 150 poise.

This invention also relates to a composition comprised of the polyamide of this invention in a major amount by weight and a first minor amount by weight of a polar wax and a second minor amount by weight of a polyolefin elastomer. By "major amount" is meant that the component makes up at least 50 weight % of the combined weight of the three components. By "minor amount" is meant that the component makes up less than 50 weight % of the combined weight of the three components. These compositions can be applied to a variety of substrates including leather and synthetic materials, woven and nonwoven fabrics, and a wide variety of polymeric materials and will readily adhere thereto. A 1–50 mil film of the composition on the substrate provides a tough resilient reinforcing coating on the substrate so that it can be shaped and otherwise molded to the desired configuration and will retain this shape during use. The compositions are particularly adaptable for use with leather, fabrics and vinyl polymers used in box-toe construction and impart greater stiffness to the substrate while maintaining flexibility.

This invention also relates to a method of manufacturing an upper for a shoe comprising applying a melt of a composition comprised of the polyamide of this invention in a major amount by weight and a first minor amount by weight of a polar wax and a second minor amount by weight of a polyolefin elastomer to a portion of an upper and allowing said melt to cool to form a solid coating on said portion of said upper. The applying and cooling are typically integrated into the manufacture of the shoe and thus, the applying and cooling are typically accomplished within the cycle time of said manufacturing. By "footwear upper" is meant that portion of the footwear above the sole. While this method is particularly useful in reinforcing the toe portion of the footwear upper, it will be useful in reinforcing other portions of the footwear upper, e.g. the heel portion, if desired.

DETAILED DESCRIPTION

The improved copolyamides of this invention are derived from polymeric fatty acids. The term "polymerized fatty acid" is intended to be generic in nature and to refer to polymerized acids obtained from fatty acids. Dicarboxylic acids produced in this manner, that is, when two moles of the monocarboxylic acid are combined, are referred to as dimer acids. Processes for the production of dimer acids are well known to the art and by way of illustration, reference may be had to U.S. Pat. Nos. 2,793,219 and 2,955,121. Thirty-six carbon (C36) dimer acids obtained by the dimerization of an unsaturated C18 acid such as oleic acid, linoleic acid and mixtures thereof (e.g. tall oil fatty acids) are especially useful and advantageously employed for the preparation of the copolyamides. Such dimer acids have as their principal component a C36 dicarboxylic acid and typically have an acid value in the range 180–215, saponification value in the range 190–205 and neutral equivalent from 265–310. Dimer acids containing less than 30% by weight by-product acids including monobasic acids, trimer acids or higher polymer acids are especially useful for this invention. The dimer acids may also be hydrogenated prior to use and/or molecularly distilled or otherwise purified to increase the C36 dimer content to 90% or more.

The term "fatty acids" refers to saturated, ethylenically unsaturated and acetylenically unsaturated, naturally occurring and synthetic monobasic aliphatic carboxylic acids which contain from about 8 to about 24 carbon atoms. While specific references are made in this application to polymerized fatty acid polyamide resins which are obtained from C18 fatty acids, it will be appreciated that the methods of this invention can likewise be employed with other polymerized fatty acid polyamides.

The preferred starting acids for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the polymerized C18 tall oil fatty acids which are used as the starting materials for the polyamide resins used in the present invention is:

| | |
|---|---|
| C18 monobasic acids (monomer) | 0–15% by wt. |
| C36 dibasic acids (dimer) | 60–95% by wt. |
| C54 (or higher) trimer acid or polybasic acids | 0.2–35% by wt. |

In preparing polymerized fatty acid polyamide resins for use in the present invention, it is preferable that the starting polymerized fatty acid contain as high a percentage as possible of the dimer (C36 dibasic) acid, e.g. at least about 90% by wt., in order to obtain optimum physical properties in the final product.

Monocarboxylic acids may be added, in addition to the monobasic acids remaining in the polymerized fatty acid, to control molecular weight. Preferred monocarboxylic acids are linear and have 2 to 22 carbon atoms, more typically from about 12 to about 20 carbon atoms. Most preferred are stearic, tall oil fatty and oleic acids. The total amount of monocarboxylic acids in the acid component should be sufficient to limit the molecular weight of the polyamide to a degree which will yield the softening point and the melt viscosity desired of the polyamide. In general, the total amount of monocarboxylic acids in the acid component will range from about 5 eq. % to about 15 eq. %, more typically from about 8 eq. % to about 12 eq. %, based on the total acid equivalents of the acid component.

The amine component will be a mixture of amines comprised of a short-chain diamine, a medium-chain diamine, and a polyoxyalkylene diamine is reacted with the above-defined acid mixture to obtain the improved copolyamide resin compositions. The short-chain and medium-chain diamines preferably correspond to the formula:

$$H_2N\text{—}(CHR)_n\text{—}NH_2$$

where "n" is 2 or 3 for the short-chain diamines and "n" is 4–8 for the medium-chain diamine, and R is hydrogen for a straight chain diamine and R is lower (e.g. C1–C4) alkyl for a branched chain diamine. Thus, examples of the useful short-chain diamines are ethylenediamine, 1,2-propylenediamine, and 1,3-propylenediamine. Examples of the medium-chain diamines include tetramethylenediamine, pentamethylenediamine, hexamethylenediamine, octamethylenediamine, 2-methyl-1,5-pentanediamine, 5-methyl-1,9-nonanediamine, and trimethylhexamethylenediamine. Especially useful copolyamides are obtained in accordance with this invention when the short-chain diamine is ethylenediamine and the medium-chain diamine is hexamethylenediamine. The equivalent ratio of short-chain to medium chain diamine will typically range from about 2:1 to about 6:1, more typically from about 3:1 to about 5:1, and most typically from about 3.8:1 to about 4.2:1.

The amine component is further comprised of a polyoxyalkylenediamine. The polyoxyalkylenediamine reactant comprises one or more amino-compounds where the amino-compound comprises both amine groups and a polyether chain.

Examples of useful polyoxyalkylenediamines have the structural formula:

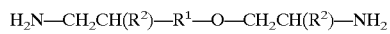

$$H_2N\text{—}CH_2CH(R^2)\text{—}R^1\text{—}O\text{—}CH_2CH(R^2)\text{—}NH_2$$

wherein:
R$^1$ represents a polyoxyalkylene chain having the structural formula:

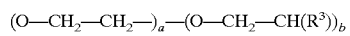

$$(O\text{—}CH_2\text{—}CH_2\text{—})_a\text{—}(O\text{—}CH_2\text{—}CH(R^3))_b$$

wherein:
R$^3$ is a monovalent organic radical selected from the group consisting of C1 to C4 aliphatic hydrocarbons, 'a' designates a number of ethoxy groups (O—CH$_2$—CH$_2$), 'b' designates a number of monosubstituted ethoxy groups (O—CH$_2$—CH(R$^3$)), the sum of 'a' and 'b' is equal to or greater than 10 but less than or equal to 300, provided that for any values of a and b the sequence of ethoxy and monosubstituted ethoxy groups within a polyoxyalkylene chain may be completely random and/or there may be blocks of ethoxy and/or monosubstituted ethoxy groups, and R$^2$ designates hydrogen or a monovalent organic radical selected from the group consisting of C1 to C4 aliphatic hydrocarbons.

The techniques to prepare suitable polyoxyalkylenediamines are known in the art, and include reacting an initiator containing two hydroxyl groups with ethylene oxide and/or monosubstituted ethylene oxide followed by conversion of the resulting terminal hydroxyl groups to amines. Illustrative of the polyoxyalkylenediamine reactants employed in the invention are the Jeffamine™ brand of polyoxyalkyleneamines available from Huntsman Corporation, Houston, Tex. These polyoxyalkylenediamines are prepared from reactions of bifunctional initiators with ethylene oxide and propylene oxide followed by conversion of terminal hydroxyl groups to amines. The most preferred polyoxyalkyleneamines are the Jeffamine™ D-series polyoxyalkyleneamines from Huntsman Chemical Company which have approximate molecular weight between about 600 and about 6,000, more preferably having a molecular weight from about 900 to about 5,000. The most preferred polyoxyalkylenediamines contain only oxypropylene groups, i.e. those polyoxyalkylenediamines of the above formula wherein "a" is zero and R$^3$ is methyl.

The number average molecular weight of the polyoxyalkylenediamine is typically between about 600 and about 6000 and, more preferably, about 1,000 and about 2,500. The equivalent ratio of the sum of the equivalents of short-chain diamine and medium-chain diamine to equivalents of polyoxyalkylenediamine will typically be greater than about 0.9:0.1, and will more typically range from about 0.92:0.08 to 0.999:0.001, even more typically from about 0.95:0.05 to about 0.995:0.005 and most typically from about 0.975:0.025 to about 0.99:0.01.

The number of free acid groups and/or free amine groups present in the polymerized fatty acid polyamide resin are directly related to the relative amount of the polymeric fatty acids, dicarboxylic acids and diamines involved in the polymerization reaction and the degree of completion of the reaction. For the above reasons, approximately stoichiometric amounts (typically with a slight excess of acid groups, e.g. a ratio of total acid to total amine groups of from about 1.001:1 to about 1.1:1, more typically from about 1.005:1 to about 1.05:1, and most typically from about 1.01:1 to about 1.02:1) of the polymerized fatty acids (and added monocarboxylic acids) and the diamines based on the total number of available acid and amine groups should be used to prepare the polyamide resins for this invention and the reaction conditions should be selected to ensure completion or substantial completion of the amidation reaction.

It is desirable that the polymerized fatty acid polyamide be the result of as complete an amidation reaction as possible between the starting acid component and the diamine component. Those skilled in the art will recognize that the degree of completion of the amidation process can be determined by evaluating the acid number and the amine number of the final polymer. The polyamide resin should have a relatively low acid number, typically less than about 40, more typically each less than about 15, and even more typically each less than about 10. Ideally, the amine number of the polyamide resin employed should be zero (0). However, it is often difficult, if not impossible, to reach complete reaction, and this value should be two or less.

The instant copolyamide resins are prepared using conventional procedures and reaction conditions known to the art. It should be noted that while reference is made to acid and amine components for purposes of determining the relative amounts of each acid and amine used to prepare the polyamide, there is no need to form a separate premix of acids and a separate premix of amines, nor is it required that all reactants be charged together at the beginning of the reaction. In general, the acid and amine components are reacted until the final product has an acid value and an amine value less than 15 and even more preferably less than 10, with the reaction being generally conducted at temperatures from about 100° C. to about 300° C. for from about 1 to about 8 hours. Most often the reactions will be heated from 140° to 240° C. until the theoretical amount of water is evolved. Generally several hours are required to complete the reaction. The reaction is preferably conducted under an inert atmosphere, such as nitrogen, and during the final stages of the reaction a vacuum is applied to the system to facilitate removal of the final traces of water and any other volatile materials. The use of acid catalysts, such as phosphoric acid, and vacuum can be used, especially in the latter part of the reaction, to yield a more complete amidation reaction.

This invention also relates to a composition comprised of the polyamide of this invention in a major amount by weight and a first minor amount by weight of a polar wax and a second minor amount by weight of a polyolefin elastomer. The wax used in the compositions of this invention is a polar wax, i.e. a wax having sufficient polar functionality to form a homogeneous melt with the polyolefin elastomer and the polyamide. Preferred examples of polar waxes are low molecular weight polyolefin (e.g. polyethylene) waxes having polar functionality arising from copolymerization or grafting with an acid functional monomer or from oxidation of the polyolefin. These preferred waxes typically have an acid number of from about 1 to about 50.

The wax component of the adhesive compositions of the present invention is preferably present in an amount of from 5 to 30% by weight, preferably from 10 to 20% by weight. It is preferred for the waxes to have a melting point of from 90° C. to 110° C. (i.e. similar to those of the preferred polyamides) although some suitable materials may have lower melting points.

Preferred waxes for use in the present invention are natural and synthetic waxes based on a hydrocarbon backbone, including polyolefin waxes and their derivatives. Synthetic waxes of this type are made, for example the Fischer-Tropsch and Ziegler processes. Especially suitable are those based on low molecular weight polyethylene generally having a molecular weight of less than 6,000, usually from 1,000 to 5,000. These waxes generally have softening points in the range of from 97° C. to 106° C. and those having a molecular weight between 2,000 and 4,000 generally have softening points between 100.5° C. and 104° C. Amongst suitable commercially available materials there may be mentioned the Epolene polyethylene waxes sold by Eastman Chemical Company including Epolene C16, available from Eastman Chemical, which is a maleic anhydride modified polyethylene. This material has been described as being manufactured according to the method of Example 1 of U.S. Pat. No. 3,484,403, the disclosure of which is incorporated herein by reference. Examples of other useful waxes are Epolene C18, also from Eastman Chemical, and the oxidized ethylene homopolymers available from Eastman Chemical as the Epolene E series and which have acid numbers ranging from 15–47.

It has been found that the incorporation of a polyolefin elastomer leads to improvements in the low temperature flexibility and brittleness of the adhesive formulations while maintaining an acceptable viscosity so that the compositions can still be applied at moderate melt temperatures, e.g. from about 120° C. to about 140° C. The polyolefin elastomer is generally included in amounts not exceeding about 20% by weight, preferably about 1% to about 15%, and more especially 5%–10%, by weight of polyamide, polar wax, and polyolefin elastomer together.

Examples of polyolefin elastomers are described in "Synthetic Elastomers", *Encyclopedia of Polymer Science and Engineering*, index vol., pp.106–127 (John Wiley & Sons, Inc., N.Y., N.Y., 1990), the disclosure of which is incorporated herein by reference. Preferred polyolefin elastomers are polyethylene copolymers having densities of less than about 0.92 g/cc and secant moduli of 2000 psi to 10,000 psi. One especially advantageous group of polyolefin elastomers are copolymers of ethylene and a $C_3$–$C_{20}$ alpha-olefin that have been polymerized in the presence of a constrained geometry catalyst. Examples of such polymers are described in U.S. Pat. Nos. 5,272,236 and 5,278,272, the disclosures of which are incorporated herein by reference. Examples of such polymers, which are copolymers of ethylene and 1-octene, more than 20% by weight of the polymer being derived from 1-octene, are commercially available from Dow Chemical under the "Engage" brand name, e.g. Engage 8200 (having a density of 0.87 g/cc and a secant modulus of 2900). Also useful are the copolymers of ethylene and 1-butylene available from Exxon under the "Exact" brand name.

The compositions can be employed to reinforce a variety of natural and synthetic, flexible substrates. They are particularly useful with leather, suede and synthetic materials; open- and closed-cell materials derived from polyurethane, vinyl, natural rubber, neoprene, styrene-butadiene copolymer, polybutadiene or the like; woven and nonwoven fabrics obtained from natural fibers such as cotton, wool, silk, sisal, hemp, jute, kenaf, sunn and ramie; woven and nonwoven fabrics derived from rayon (viscose), cellulose esters such as cellulose acetate and cellulose triacetate, proteinaceous fibers, such as those derived from casein, and synthetic fibers or filaments including polyamides such as those obtained by the condensation of adipic acid and hexamethylenediamine or the like, polyesters such as polyethylene terephthalate, acrylic fibers containing a minimum of about 85 percent acrylonitrile with vinyl chloride, vinyl acetate, methacrylonitrile or the like and the modacrylic fibers which contain lesser amounts of acrylonitrile, copolymers of vinyl chloride with vinyl acetate or vinylidene chloride, the formal derivatives of polyvinyl alcohol and olefin polymers such as polyethylene and polypropylene; paper; cork; elastomeric materials; and the like. The copolyamides are applied to the substrate as a hot melt and upon cooling provide greater stiffness while maintaining flexibility of the substrate. The resin can be applied using conventional hot melt application procedures, such as printing, dipping, spreading, rolling, etc. and the film thickness can range from about 1 mil up to about 50 mils. While for most constructions the resin is applied to only one side of the substrate, it may be applied to both sides and a fabric or the like applied to either side, or both, to form a sandwich type construction. In a typical box-toe construction, the copolyamide is printed onto one side of the substrate to a thickness of 2 to 10 mils. A fabric (nylon, polyester, cotton, etc.) liner may be applied to the interior of the box-toe before the resin has completely set.

Because the compositions of this invention typically have a softening point in the range of 90°–110° C., and viscosity (140° C.) less than 150 poise, a melt of the composition at a temperature of from about 120° to about 140° C. can be easily applied to a substrate by hot melt coating techniques. It is an advantage of the compositions of this invention that such a melt can be applied at such temperatures because some substrates can be degraded at higher temperatures. For example, water-proofed leathers typically contain significant levels of organics that will volatilize from the leather at temperatures used to apply conventional box toe coatings, e.g. temperatures of from 160°–175° C. (or even higher). Such volatilization can cause the organics to evaporate from the surface of the substrate and form bubbles in the composition. These bubbles can thus roughen the surface of the composition and can lead to a degradation of the properties of the resulting coating and/or substrate.

The following examples illustrate the invention more fully, however, they are not intended to limit the scope of the invention and numerous variations will be evident to those skilled in the art. In this specification, and the following examples, all parts, ratios and percentages are on a weight basis unless otherwise indicated.

EXAMPLES

In these examples, the following general procedures were used.

Part 1
(Polyamide base resin)

The polyamide acid and amine components were charged to a resin kettle equipped with mechanical stirrer, thermocouple, nitrogen blanket and distillation head. The dimer acid was a blend of predominantly C36 polymerized fatty acid containing 2 wt. % monomeric acids, 96 wt. % dimeric acids and 2 wt. % trimeric acids and a predominantly C36 polymerized fatty acid containing 12 wt. % monomeric acids, 77 wt. % dimeric acids and 11 wt. % trimeric acids in a weight ratio of about 2:1 of the former to the latter (nominal equivalent weight of the blend being 282 g/equiv.). The monocarboxylic acid had a nominal equivalent weight of 285 g/equiv. The hexamethylenediamine (HMDA) was at 70% solids in solution. The polyoxyalkylenediamine was a polyoxypropylenediamine having a molecular weight of about 2000 g/mole and is available from Huntsman Chemical, Houston, Tex., as Jeffamine D-2000. Then about 0.01 wt. % phosphoric acid as catalyst, 0.3 wt. % antioxidant (high molecular weight hindered phenols available form Giba-Geigy as Irganox 1010) and 0.05 wt. % defoamer were added and the reagents mixed. The temperature of the reaction is raised to 227° C. Water of reaction is removed overhead. Once the reaction reaches temperature, it is held for a minimum of 90 minutes. At the end of the 90-minute hold, vacuum is applied to the reaction for 45–60 minutes. The vacuum is released with nitrogen. Part 1 is complete and may be dumped for use later, or may be used directly for addition of Part 2. If the reaction is to be used directly, a small sample can be removed for determination of Part 1 physical properties.

Part 2
(Blending of polyamide base resin with wax or wax/polyolefin elastomer)

The product from Part 1 is heated to 227° C. When the reaction is at temperature, a second portion of antioxidant (0.24 wt. %) is added. The wax, Epolene C16, Eastman Chemical, if added, is added in small steps in order to maintain the reaction temperature above 204° C. The polyolefin elastomer, Engage EG 8200, Dow Chemical, Midland, Mich., if added, is charged to the reaction in small steps after the wax has completely dissolved and is well mixed (typically 15 minutes after wax addition is complete). When wax/elastomer addition is complete, the reaction is placed under vacuum and held for 20–30 minutes. The vacuum is released with nitrogen and the blend is dumped. Final properties are determined. The blend of Example 4 separated into distinct phases and was not further tested. The control resin is commercially available as MACROROD 2600 from Henkel Corporation, LaGrange, Ill.

Box Toe Testing

Box toe application:

Box toe adhesives prepared above are tested for box toe application performance by applying the adhesive to selected substrates. Flow properties, stringing character, and flexibility are determined by printing onto vinyl coated fabric pieces (vinyl side). Box toe thickness is adjusted to be approximately 1 mm at the center of the toe. The box toe application is carried out on a Sysco Machinery Corp. Box Toe Application Machine. The melt pot temperature is set for the desired application temperature and the melt temperature measured with a hand held thermocouple. Once the adhesive has been applied and is cool, the print on box toe can be removed from the face (vinyl side) of the material.

Box toe adhesive performance tests:

The appearance, flow behavior, and stringing of the box toe adhesive under evaluation are determined qualitatively by the operator.

Box toe flexibility/cracking tests:

Box toes removed from the material are used to determine flexibility. Samples are maintained for a minimum of 16 hours at the desired test temperature. Low temperature samples were held in a freezer maintained between −5° and −10° C. Flexibility/cracking performance is determined by folding the box toe in half twice, first along the short axis, then in half again along the long axis. The box toe is considered to fail the cracking test if it breaks or cracks.

Tear Resistance:

Box toes removed from material are torn by hand from top to bottom. The relative amount of effort required to tear is used to judge the quality of tear resistance and rated good or poor.

Softening point is determined after 18 hours in accordance with ASTM Test Method E-28 and viscosity is determined in accordance with ASTM D3236 RVT, Spindle 27.

| | Formulations | | | | | | | | |
|---|---|---|---|---|---|---|---|---|---|
| Example number | 1 | 2 | 3 | 4 | 5 | 6 | 7 | 8 | 9 |
| PART 1 (Base Resin) | wt. % of Part 1 | | | | | | | | |
| Polymerized Fatty Acid | 80.7 | 80.7 | 80.34 | 80.34 | 80.34 | 80.34 | 82.03 | 82 | 82 |
| Monocarboxylic Fatty Acid | 5 | 5 | 5 | 5 | 5 | 5 | 5.1 | 5.1 | 5.1 |
| Ethylenediamine | 7.1 | 7.1 | 7.1 | 7.1 | 7.1 | 7.1 | 7.25 | 7.25 | 7.25 |
| HMDA (70%) | 5.24 | 5.24 | 5 | 5 | 5 | 5 | 5.31 | 5.3 | 5.3 |
| Polyoxypropylenediamine | 1.6 | 1.6 | 2.25 | 2.25 | 2.25 | 2.25 | 0.00 | 0.00 | 0.00 |
| Catalyst | 0.01 | 0.01 | 0.01 | 0.01 | 0.01 | 0.01 | 0.01 | 0.01 | 0.01 |
| Antioxidant | 0.3 | 0.3 | 0.3 | 0.3 | 0.3 | 0.3 | 0.3 | 0.3 | 0.3 |
| Defoamer | 0.05 | 0.05 | 0.05 | 0.05 | 0.05 | 0.05 | 0.05 | 0.04 | 0.04 |
| Part 2 (Added for Final Product) | % added in Part 2, based on total Part 1 charge | | | | | | | | |
| Antioxidant | 0.3 | 0.3 | 0.3 | 0.3 | 0.3 | 0.3 | 0.3 | 0.3 | 0.3 |
| Polar Wax | 15 | 16.67 | 15 | 0.00 | 33.33 | 22.22 | 15 | 18.89 | 33.33 |
| Polyolefin Elastomer | 7.22 | 8.33 | 7.22 | 22.22 | 0.00 | 11.11 | 7.22 | 9.44 | 0.00 |

| | Physical Properties and Performance | | | | | | | | | |
|---|---|---|---|---|---|---|---|---|---|---|
| | Control | 1 | 2 | 3 | 4 | 5 | 6 | 7 | 8 | 9 |
| Softening Pt. Part 1, °C. | — | 106 | 101 | 99 | — | 102 | 97 | — | 103 | 105 |
| Softening Pt. Part 2, °C. | 137 | 102 | 103 | 100 | — | 107 | 102 | 104 | 104 | 107 |
| Viscosity at 140° C., P | — | 143 | 171 | 133 | — | 163 | 190 | 158 | 185 | 265 |
| Viscosity at 160° C., P | 235 | 61 | 68 | 56 | — | 71 | 81 | 64 | 76 | 110 |
| Tensile Strength, Ultimate, psi | 700 | 480 | 520 | 620 | — | 580 | 590 | 550 | 550 | 610 |
| % Elongation at break | 76 | 74 | 59 | 142 | — | 62 | 127 | 82 | 84 | 84 |
| Box toe application, Stringing | slight | slight | slight | slight | — | slight | slight | very | slight | slight |
| Tear resistance | good | good | good | good | — | poor | good | good | good | poor |
| Crack Test @ −5° C. (% pass) | 95 | 66 | 90 | 97 | — | 95 | 100 | 58 | 40 | 92 |
| Bubbling on leather | yes 155° C. | | no 130° C. | | — | | | | | |

What is claimed is:

1. A polyamide resin comprising the reaction product derived from the reaction of
   A) an acid component comprised of a major concentration of a dimer acid and minor concentration of a monobasic acid, and
   B) an amine component comprised of a major concentration of a short-chain alkylenediamine of the formula $H_2N(CHR)_n$—$NH_2$ where n is 2 or 3 and R is hydrogen or low alkyl, a first minor concentration of a medium-chain alkylenediamine of the formula $H_2N(CHR)_n$—$NH_2$ where n is 4 to 8 and R is hydrogen or lower alkyl, and a second minor concentration of a polyoxyalkylenediamine having a number average molecular weight greater than about 500.

2. A composition as claimed in claim 1 wherein the equivalent ratio of dimer acid to monobasic acid ranges from about 0.95:0.05 to about 0.7:0.3.

3. A composition as claimed in claim 1 wherein said dimer acid is comprised of a major amount by weight of species having 36 carbon atoms.

4. A composition as claimed in claim 1 wherein said monobasic acid is linear and has from about 12 to about 20 carbon atoms.

5. A composition as claimed in claim 1 wherein the amount of said monobasic acid ranges from about 5 eq. % to about 15 eq. % of the total acid equivalents of the acid component.

6. A composition as claimed in claim 1 wherein said acid component is essentially free of short-chain saturated aliphatic dicarboxylic acids containing 7 to 12 carbon atoms.

7. A composition as claimed in claim 1 wherein the equivalent ratio of the equivalents of short-chain diamine to equivalents of medium-chain diamine range from about 2:1 to about 6:1.

8. A composition as claimed in claim 1 wherein the equivalent ratio of the equivalents of short-chain diamine to equivalents of medium-chain diamine range from about 3:1 to about 5:1.

9. A composition as claimed in claim 1 wherein the equivalent ratio of the equivalents of short-chain diamine to equivalents of medium-chain diamine range from about 3.8:1 to about 4.2:1.

10. A composition as claimed in claim 1 wherein the short-chain diamine is ethylenediamine and the medium-chain diamine is hexamethylenediamine.

11. A composition as claimed in claim 1 wherein the equivalent ratio of the sum of equivalents of short-chain and medium-chain diamine to equivalents of polyoxyalkylenediamine range from about 0.9:0.1 to about 0.999:0.001.

12. A composition as claimed in claim 1 wherein the equivalent ratio of the sum of equivalents of short-chain and medium-chain diamine to equivalents of polyoxyalkylenediamine range from about 0.975:0.025 to about 0.99:0.01.

13. A composition as claimed in claim 1 wherein said polyoxyalkylenediamine has the structural formula:

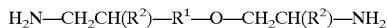

wherein:

$R^1$ represents a polyoxyalkylene chain having the structural formula:

wherein:

$R^3$ is a monovalent organic radical selected from the group consisting of C1 to C4 aliphatic hydrocarbons, 'a' designates a number of ethoxy groups, 'b' designates a number of monosubstituted ethoxy groups, the sum of 'a' and 'b' is equal to or greater than 10 but less than or equal to 300, provided that the sum of 'a' and 'b' is such that the polyoxyalkylenediamine has a number average molecular weight of greater than about 5000 and for any values of 'a' and 'b' the sequence of ethoxy and monosubstituted ethoxy groups within a polyoxyalkylene chain may be completely random or blocks of ethoxy or monosubstituted ethoxy groups or both may be present therein, and $R^2$ designates hydrogen or a monovalent organic radical selected from the group consisting of C1 to C4 aliphatic hydrocarbons.

14. A composition as claimed in claim 13 wherein "a" is zero and $R^3$ is methyl.

15. A composition as claimed in claim 1 wherein said polyoxyalkylenediamine has a number average molecular weight from about 600 to about 6,000.

16. A composition as claimed in claim 1 wherein said polyoxyalkylenediamine has a number average molecular weight from about 900 to about 5000.

17. A composition as claimed in claim 1 wherein said polyoxyalkylenediamine has a number average molecular weight from about 1,000 and 2,500.

18. A composition as claimed in claim 1 wherein the ratio of total acid equivalents of said acid component to total amine equivalents of said amine component is from about 1:1 to about 1.1:1.

19. A composition as claimed in claim 1 wherein the ratio of total acid equivalents of said acid component to total amine equivalents of said amine component is from 1.01:1 to about 1.02:1.

20. A composition as claimed in claim 1 wherein said polyamide resin has an acid number of less than about 40.

21. A composition as claimed in claim 1 wherein said polyamide resin has an acid number of less than about 10.

22. A composition as claimed in claim 1 wherein said polyamide resin has an amine number of less than about 2.

23. A composition as claimed in claim 1 wherein said polyamide resin has an amine number of essentially zero.

24. A composition as claimed in claim 1 wherein said polyamide resin has a softening point of less than about 125° C.

25. A composition as claimed in claim 1 wherein said polyamide resin has a softening point in the range of about 90° to about 110° C.

26. A polyamide resin comprising the reaction product derived from the reaction of A) an acid component comprised of a dimer acid and a monobasic acid in an equivalent ratio of dimer acid to monobasic acid ranges from about 0.95:0.05 to about 0.7:0.3, and B) an amine component comprised of a major concentration of a short-chain alkylenediamine of the formula $H_2N(CHR)_n$—$NH_2$ where n is 2 or 3 and R is hydrogen or lower alkyl, a first minor concentration of a medium-chain alkylenediamine of the formula $H_2N(CHR)_n$—$NH_2$ where n is 4 to 8 and R is hydrogen or lower alkyl, and a second minor concentration of a polyoxyalkylenediamine having a number average molecular weight of from about 1,000 to about 5,000, wherein the equivalent ratio of the equivalents of short-chain diamine to equivalents of medium-chain diamine range from about 2:1 to about 6:1, wherein the equivalent ratio of the sum of equivalents of short-chain and medium-chain diamine to equivalents of polyoxyalkylenediamine range from about 0.975:0.025 to about 0.99:0.01, and wherein said polyamide resin has an amine number of less than about 2 and a softening point in the range of about 90° to about 110° C.

27. A composition as claimed in claim 26 wherein said short-chain diamine is ethylenediamine, said medium-chain diamine in hexamethylenediamine, said polyoxyalkylenediamine is a polyoxypropylenediamine, said dimer acid is comprised of a major amount by weight of species having 36 carbon atoms, and said monobasic acid is linear and has from about 12 to about 20 carbon atoms.

28. A composition comprised of

I) a major amount by weight of a polyamide resin comprising the reaction product derived from the reaction of A) an acid component comprised of a major concentration of a dimer acid and minor concentration of a monobasic acid and B) an amine component comprised of a major concentration of a short-chain alkylenediamine of the formula $H_2N(CHR)_n$—$NH_2$ where n is 2 or 3 and R is hydrogen or lower alkyl, a first minor concentration of a medium-chain alkylenediamine of the formula $H_2N(CHR)_n$—$NH_2$ where n is 4 to 8 and R is hydrogen or lower alkyl, and a second minor concentration of a polyoxyalkylenediamine having a number average molecular weight greater than about 500, II) a first minor amount by weight of a polar wax and, III) a second minor amount by weight of a polyolefin elastomer.

29. A composition as claimed in claim 28 wherein said amount by weight of said polar wax is sufficient to form a homogeneous melt with the polyolefin elastomer and the polyamide.

30. A composition as claimed in claim 28 wherein said polar wax is present in an amount of from about 5 to about 30% by weight of said composition.

31. A composition as claimed in claim 28 wherein said polar wax is present in an amount of from about 10 to about 20% by weight of said composition.

32. A composition as claimed in claim 28 wherein said polar wax is selected from the group consisting of polyolefins having polar functionality arising from copolymerization or grafting with an acid functional monomer and polyolefins having polar functionality arising from oxidation of the polyolefin.

33. A composition as claimed in claim 28 wherein said polar wax has an acid number of from about 1 to about 50.

34. A composition as claimed in claim 28 wherein said polar wax has a melting point of from about 90° C. to about 110° C.

35. A composition as claimed in claim 28 wherein said polar wax is a polyethylene wax having a number average molecular weight of less than about 6,000.

36. A composition as claimed in claim 28 wherein said polar wax is a polyethylene wax having a number average molecular weight of from about 1,000 to about 5,000.

37. A composition as claimed in claim 28 wherein said polar wax is a maleic anhydride modified polyethylene having a number average molecular weight of from about 1,000 to about 5,000.

38. A composition as claimed in claim 28 wherein said polyolefin elastomer is present in an amount not exceeding about 20% by weight of said composition.

39. A composition as claimed in claim 28 wherein said polyolefin elastomer is present in an amount of from about 1% to about 15% by weight of said composition.

40. A composition as claimed in claim 28 wherein said polyolefin elastomer is present in an amount of from about 5% to about 10% by weight of said composition.

41. A composition as claimed in claim 28 wherein said polyolefin elastomer is polyethylene copolymers having a density of less than about 0.92 g/cc and secant moduli of 2000 psi to 10,000 psi.

42. A composition as claimed in claim 28 wherein said polyolefin elastomer is a copolymer of ethylene and a $C_3$–$C_{20}$ alpha-olefin that have been polymerized in the presence of a constrained geometry catalyst.

43. A composition as claimed in claim 42 wherein said polyolefin elastomer is a copolymer of ethylene and 1-octene, more than 20% by weight of the polymer being derived from 1-octene.

44. A composition comprised of:
   I) a polyamide resin comprising the reaction product derived from the reaction of
      A) an acid component comprised of a dimer acid and a monobasic acid in an equivalent ratio of dimer acid to monobasic acid ranges from about 0.95:0.05 to about 0.7:0.3, and
      B) an amine component comprised of a major concentration of a short-chain alkylenediamine of the formula $H_2N(CHR)_n$—$NH_2$ where n is 2 or 3 and R is hydrogen or lower alkyl, a first minor concentration of a medium-chain alkylenediamine of the formula $H_2N(CHR)_n$—$NH_2$ where n is 4 to 8 and R is hydrogen or lower alkyl, and a second minor concentration of a polyoxyalkylenediamine having a number average molecular weight of from about 1,000 to about 5,000, wherein the equivalent ratio of the equivalents of short-chain diamine to equivalents of medium-chain diamine range from about 2:1 to about 6:1, wherein the equivalent ratio of the sum of equivalents of short-chain and medium-chain diamine to equivalents of polyoxyalkylenediamine range from about 0.975:0.025 to about 0.99:0.01, and wherein said polyamide resin has an amine number of less than about 2 and softening point of less than about 125° C.,
   II) from about 5% to about 30% by weight of a polar wax selected from the group consisting of polyolefins having polar functionality derived from copolymerization or grafting with an acid functional monomer and polyolefins having polar functionality derived from oxidation of the polyolefin, wherein said polar wax has an acid number of from about 1 to about 50, and a melting point of from about 90° C. to about 110° C.,
   III) from about 1% to about 15% by weight of a polyolefin elastomer having a density of less than about 0.92 g/cc and secant moduli of 2000 psi to 10,000 psi and which is selected from the group consisting of copolymers of ethylene and a $C_3$–$C_{20}$ alpha-olefin that have been polymerized in the presence of a constrained geometry catalyst.

45. A composition as claimed in claim 44 wherein said polar wax is a maleic anhydride modified polyethylene having a molecular weight of from about 1,000 to about 5,000 and wherein said polyolefin elastomer is a copolymer of ethylene and 1-octene, more than 20% by weight of the polymer being derived from 1-octene.

* * * * *